No. 614,718. Patented Nov. 22, 1898.
G. E. HIGGINS & W. C. HIBBARD.
VALVE FOR AUTOMATIC SPRINKLER SYSTEMS.
(Application filed Dec. 11, 1896.)
(No Model.) 2 Sheets—Sheet 2.
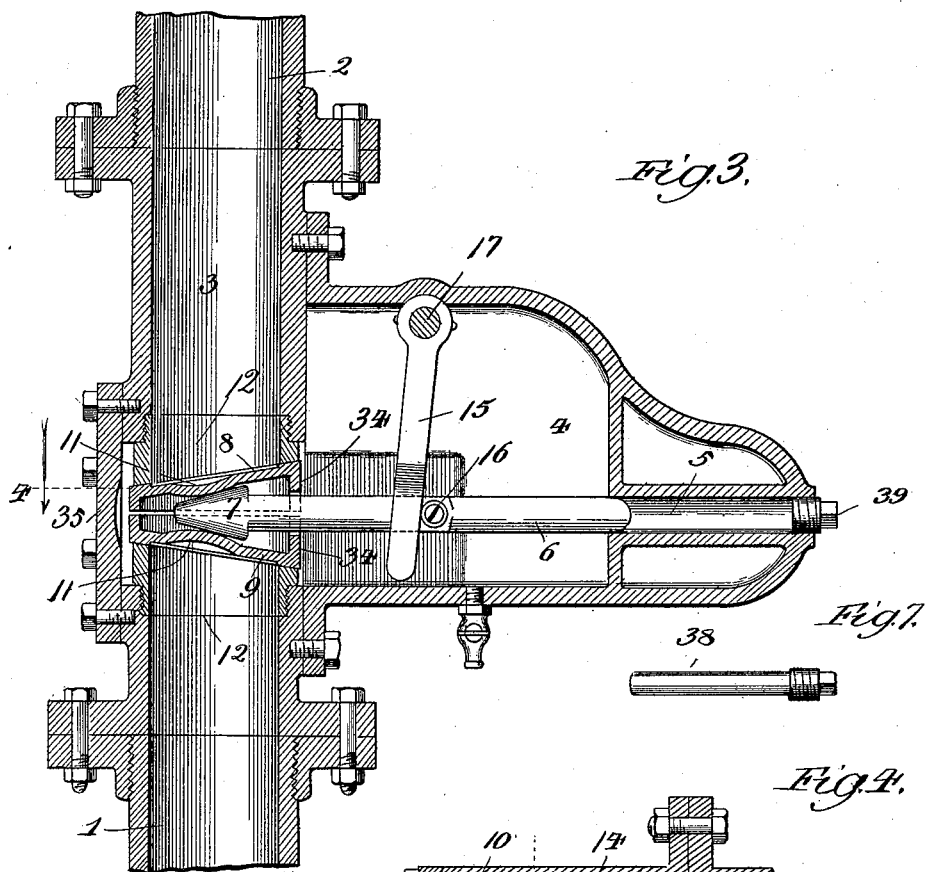
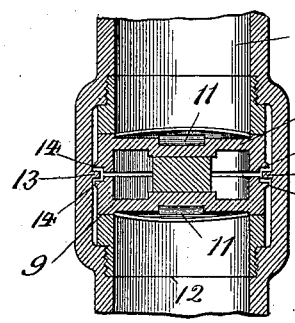
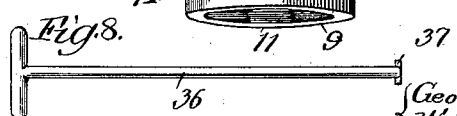

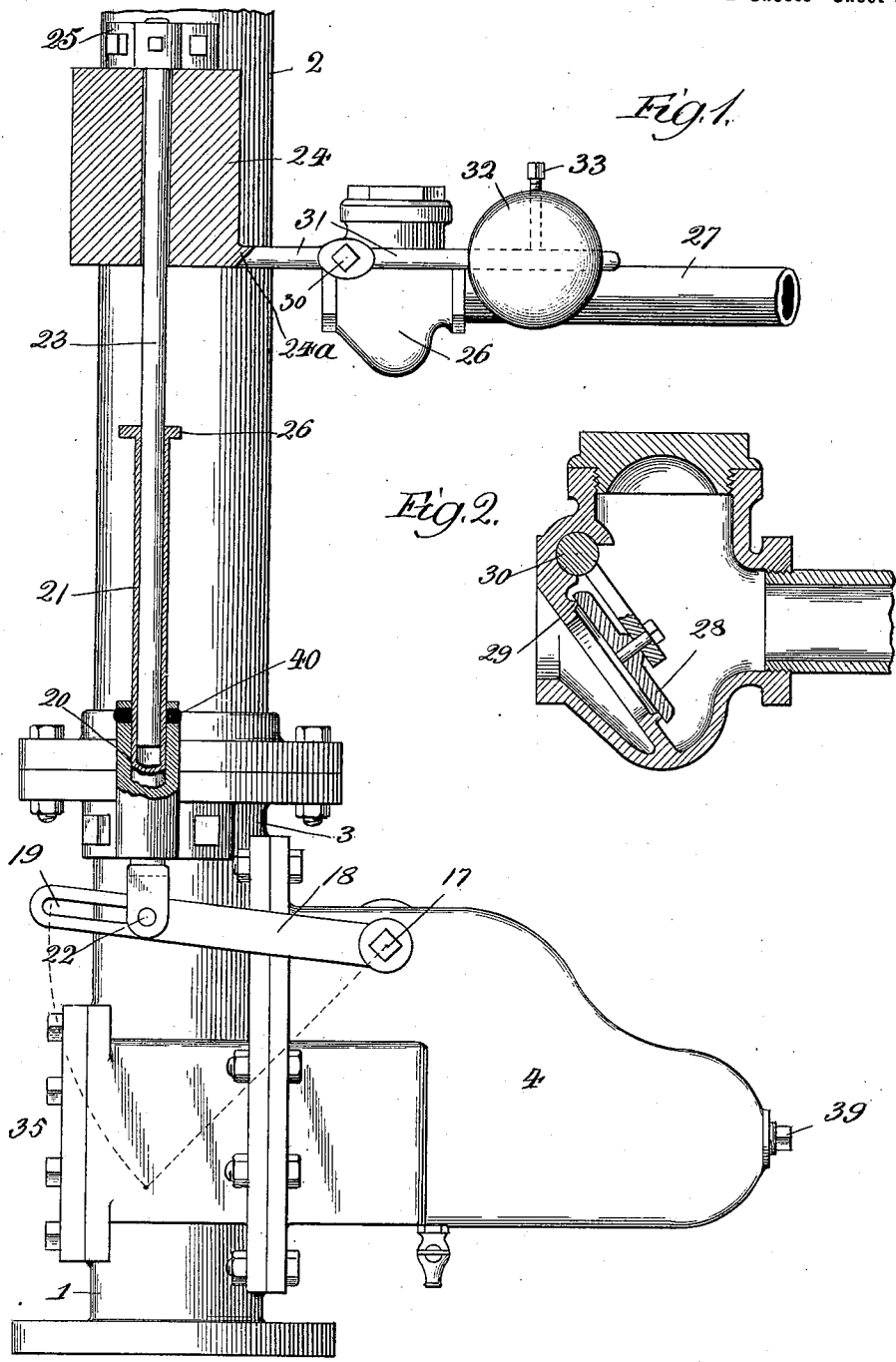

UNITED STATES PATENT OFFICE.

GEORGE E. HIGGINS AND WILLIAM C. HIBBARD, OF CHICAGO, ILLINOIS.

VALVE FOR AUTOMATIC SPRINKLER SYSTEMS.

SPECIFICATION forming part of Letters Patent No. 614,718, dated November 22, 1898.

Application filed December 11, 1896. Serial No. 615,427. (No model.)

*To all whom it may concern:*

Be it known that we, GEORGE E. HIGGINS and WILLIAM C. HIBBARD, residing at Chicago, in the county of Cook and State of Illinois, have invented certain new and useful Improvements in Valves for Automatic Sprinkler Systems, of which the following is a specification.

Our invention has relation to a dry-pipe automatic sprinkler system, and particularly to the valve for automatically controlling the supply of water to the distributing-pipes of the system.

Our object is to provide and construct a valve which shall be simple and inexpensive in its manufacture and positive and reliable in its operation. The valve proper is caused to seat firmly by a novel form of construction in a preferably straightway unrestricted passage between the water-inlet pipe and base of the riser of the system, and the valve-operating mechanism is capable of adjustment whereby the valve may be opened at different predetermined amounts of decrease of pressure in the pipes of the system.

Our invention embodies other novel and advantageous features and details of construction which will be apparent from the description hereinafter made.

In the drawings, Figure 1 is a side elevation of the valve complete, with a portion thereof in section; Fig. 2, a section of the valve communicating with the pipes of the system and controlling the weight and forming a portion of the releasing device; Fig. 3, a section of the valve proper and its casing; Fig. 4, a section on line 4 of Fig. 3, looking in the direction of the arrow; Fig. 5, a section on line 5 of Fig. 4; Fig. 6, an end view of the head of the valve as it would appear when viewing it from the left hand of Fig. 3; Fig. 7, a view of a screw-bolt or key used in locking the valve, and Fig. 8 a view of a key-wrench for gripping the head of the valve and drawing it upon its seats.

Between the usual and well-known water-inlet pipe 1 and the base 2 of the riser of any sprinkler system of the ordinary construction we arrange our automatic-valve device, which comprises, first a casing 3, which forms practically a continuous passage between the inlet 1 and base 2. This passage is preferably as shown in the drawings—that is to say, it is straightway and unrestricted, so that when not closed by the valve it forms an uninterrupted passage for the water from the mains into the distributing-pipes.

Bolted or otherwise secured in an air-tight manner upon the section or casing 3 is a casing or bonnet 4. Within this casing a guide 5 is suitably formed for one end of the stem or plunger-rod 6 of the valve proper. The other end 7 extends through a side opening in the section 3 when in closed position, as shown in Fig. 1. This end is preferably substantially wedge-shaped and is adapted to enter in between two solid disk-like members or bodies 8 and 9, constituting sections of a valve. These disks are similar in construction and are loosely held together by suitable screws 10. Each disk or section has a depressed portion forming an inwardly-extending surface 11, against which bears the wedge-shaped end of the rod or stem 6, acting to cause a partial separation of the disks. The sections are loosely mounted on the plunger-rod, which has a play or independent movement therein and are adapted to be shifted by it in its reciprocating movements. In normal position there is a space between the head of the wedge and the flanges 34 for a purpose hereinafter set forth, which arrangement is clearly illustrated in Fig. 3 of the drawings.

Two rings forming the seats for the valves are screwed or otherwise secured in the main passage on either side of the valve and respectively above and below the side opening to the water-passage. These seats are inclined reversely to each other, so that whenever rod 6 is moved to the left, Fig. 1, the disks are separated and forced tightly upon the seats 12, thereby effectually closing communication between the water-inlet and the sprinkler system. These seats are preferably circular, and the valve-sections are provided on their outer faces with a circular ridge adapted to fit accurately upon the seats.

Guides 13 are formed upon opposite sides of the inner walls of section 3 and extend in between the projecting flanges 14 of the valve sections or disks held loosely together by the screws 10. The object of these guides is to provide for the proper reciprocating movement of the valve and prevent displacement or twisting or rotation of the parts. The valve may consequently be termed a "reciprocating" or "plunger" valve, actuated by a rod which shifts the valve. The movement or shifting of the rod in one direction carries the valve across the passage and, separating the sections, forces them upon the seats to close the passage. The movement in the opposite direction imparts a blow and thereby unseats the valve and withdraws the same from the passage to open the same.

The mechanism for operating the valve in an automatic manner comprises a lever device connected to the valve-stem and operated by a falling weight under control of the air-pressure of the system and conditioned to fall upon a reduction of that pressure. The lever device consists of an arm 15, bifurcated at its lower end, which straddles the valve-stem or plunger 6 and contacts pins or studs 16 thereon. This arm is keyed or otherwise secured upon a pin or shaft 17, one of whose ends is journaled within the casing 4, upon one of its walls, while the other end extends through an ordinary stuffing-box in the side of the casing. Upon the outer end of the pin 17 an arm 18 is secured and provided at its free end with a longitudinal slot 19. Vertically mounted in bearings 20 is a plunger or rod 21, whose lower end is bifurcated to straddle arm 18 and provided with a pin 22, on which the slot travels. The upper end of the plunger is drilled out to form a sleeve in which enters a rod 23, acting as a guide for an elevated and suspended weight 24. This rod extends through the weight and is fastened at its upper end and supported by the clamp or fastening 25. The upper end of the rod 21 is provided with a flange 26, against which the weight strikes in its descent, as presently explained. In order to cushion the blow of the weight, a suitable rubber ring or washer 40 surrounds the plunger-rod, as shown. Adjacent to the weight is placed a suitable valve 26, communicating by pipe 27 directly with the system. The valve 28 has a seat 29 and is connected to a pin 30, so that the valve is pivoted and normally held closed and to its seat by the pressure of the system. The valve pin or axis extends extraneous of the casing and a lever 31 is secured thereto as a fulcrum, forming a lever of the first class. The short arm of the lever is preferably beveled at its end and extends under a projection 24ª upon the weight, thereby supporting the weight when the system is in normal condition and not in action. The other arm of the lever carries a counterweight or body 22, which is adjustable thereon and secured in predetermined positions upon the lever by a set-screw 33. This weight, however, is insufficient of itself to sustain the main weight 24, which is sustained by the air-pressure of the system acting in conjunction with and in aid of the counterweight through the valve 28 and its pin, which is connected to the lever. The effect of this valve when under pressure is to hold the lever in a horizontal position. The body 32 is so adjusted on the lever that its weight plus the pressure of the system exerted upon valve 28 is sufficient to maintain the weight 24 in a suspended position. When, however, in case of the reduction of pressure in the system by the opening of one or more sprinkler-heads by fire, the valve 28 no longer aids the weight 32 in sustaining the weight 24 and the latter will fall. Guided by rod 23 it will strike the plunger 21 and move the arm 18, which in turn operates arm 15, causing the same to move to the right, Fig. 1, in the guide 5. This arm, contacting studs 16, reciprocates the stem 6, whose wedge-like head strikes against flanges 34 of the valve-sections and withdraws such valve entirely from the passage, permitting water to enter the distributing-pipes. The plunger is thus quickly reciprocated by the impact device, and as it has an independent movement or lost motion before it meets the flanges 34 the valve-sections are given a powerful blow by the wedge-shaped head of the plunger, whereby the primary effect of the impact of the released weight is increased.

In order to provide for restoring the parts to their normal position, (shown in Fig. 1,) a hand-hole is formed in the valve-casing adjacent to the valve-body and is covered by a cap 35, which is removable. After such cap is removed a hook device 36 is used to catch the valve to draw it forward again upon its seat. This hook has two lugs 37 upon its end, which are inserted between the disks, whereupon the hook device is turned a quarter and the valve thereupon drawn to its seat.

A screw or bolt or locking-key 38, substantially as shown in Fig. 7, may be employed for locking the valve and keeping it upon its seat. When the valve is drawn to its seat, as above described, the screw-plug 39 is removed from casing 4 and the bolt 38 then inserted. Its end contacts the stem 6 and forces the valve tightly upon the seats. This is retained until the system is again under pressure, whereupon it is removed and the plug replaced.

In our construction a large and direct passage is provided under the control of a simple and reliable valve, which may be withdrawn entirely clear of the passage. Mechanism for operating the valve is so adjustable that it may be actuated by any predetermined decrease of pressure in the system, whether slight or marked. This feature of adjustability or, in other words, the regulating of the sensitiveness of the valve is of paramount importance in view of the varying requirements of different boards of underwriters regarding the amount of decrease of pressure required to put the system in operation. Furthermore, our valve is so sensitive that it is operated to its full capacity by the opening of a single sprinkler-head. When our valve is used, a much lower air-pressure may be carried in the system, and consequently the water will reach the open sprinklers in less time than in those system employing valves requiring a high air-pressure.

Although we have described more or less precise forms and details of construction, we do so simply for clearness of description and without intending to limit ourselves to such details, as we contemplate changes in form, proportion of parts, and the substitution of equivalents as circumstances may suggest or render expedient and without departing from the spirit and scope of our invention and claims.

We claim—

1. In a sprinkler system, the combination with a water-inlet, a valve governing a passage from the water-inlet to the system comprising two parts or sections, a rod one of whose ends has a lost motion between the sections, said rod normally spreading such parts and holding them upon their seats at its limit of motion in one direction and adapted to contact the sections and deliver a blow thereto in its travel in the opposite direction for unseating and withdrawing the valve, and means for automatically reciprocating the rod.

2. In a sprinkler system, the combination of a water-inlet communicating in the action of the system with the base of the system, a valve device normally closing such water-inlet, a rod having its end confined in the valve device but having a lost motion therein, and an impact device for automatically reciprocating the rod to cause it to travel through its lost motion and thereby strike the valve with increased effect.

3. In a sprinkler system, the combination of a water conductor or passage between a water-supply and the system, a two-part valve controlling such passage, such parts having a depending flange upon their adjoining faces, a plunger-rod having a wedge-shaped head working between said parts, the head in normal position tending to separate said parts and seat them and providing a space between itself and the flanges through which space the head is adapted to reciprocate, and an impact device for reciprocating the plunger-rod and causing the head to strike the flanges to unseat and withdraw said valve.

4. In a sprinkler system, the combination with a water conductor or passage from a water-supply to the system, of a valve device governing such passage and comprising two loosely-connected sections 8 and 9 adapted to be seated in the passage and having flanges 34, a rod 6 having a head 7 movable between the sections and normally tending to separate and seat them, the head of the rod in normal position being arranged forward away from the flanges, and an impact device for reciprocating the rod to cause its head to strike the flanges and thereby increase the blow effect or impact.

5. In a sprinkler system, the combination of a water-conductor forming a passage between a water-supply and the system, a plunger, a two-part collapsible valve controlled by the plunger and normally extending across the passage to close the same, the plunger having one end working loosely within the two parts of the valve and having a projection therewithin, and means for automatically reciprocating the plunger to cause its projection to strike the valve parts and deliver a blow thereto.

6. In a sprinkler system, in combination with a water-conductor forming a passage from the water-supply to the system, a valve controlling said passage and formed in two sections each having a flange upon the adjoining ends, a plunger having an enlarged head working within the sections and through the flanges and also having a lost motion in the valve-sections and providing in normal position a space between its head and said flanges, and means for automatically actuating the plunger to cause its head to strike the flanges and deliver a blow thereto in the withdrawal of the sections of the valve from the passage.

7. In a sprinkler system, the combination with a pipe or passage from a water-inlet to the system and having an opening in one side thereof, a casing communicating with such opening, two reversely-inclined valve-seats in such pipe or passage and located respectively above and below the side opening, a valve in two sections adapted to normally fit upon the seats respectively and substantially wedge-shaped, a rod having a lost motion between the sections and whose movement in one direction separates and seats the sections and whose movement in the opposite direction causes it to strike against the sections of the valve and thereby unseat and withdraw the valve through the side opening into the valve-casing, guides in the casing for the valve and front end of the rod, a guide for the other end of the rod, and means for automatically withdrawing the rod to deliver a blow to, and unseat, the valve.

8. In a sprinkler system, the combination with a pipe or passage from a water-supply to the system and provided with a side opening, a valve working through such opening and normally interrupting and closing the passage, such valve being formed in two sections, a rod or stem having a lost motion between the sections, a lever device having an arm connected to the rod for reciprocating it and a suspended weight conditioned to fall upon reduction of pressure in the system and contact the lever device and cause the rod in its reciprocation to first strike the valve-sections and then withdraw them from the passage.

9. In a sprinkler system, the combination with a water-inlet communicating with the system, of a plunger-valve governing such inlet, a suspended weight, a connection with the valve operated by the weight when released to open the valve, a counterweight tending to maintain the first weight in a suspended position but insufficient of itself for such purpose, and means for communicating the air-pressure of the sprinkler system to the aid of the counterweight for assisting such counterweight to maintain the first weight suspended.

10. In a sprinkler system, the combination with a water-inlet communicating with the system, a valve governing such inlet, a suspended weight, a connection with the valve operated by the weight when released to open the valve, a lever-arm normally supporting the weight at one end, a counterweight at the other end and means under control of the pressure in the system for aiding the weight of the counterweight to sustain the suspended weight.

11. In a sprinkler system, the combination with a water-inlet communicating with the system, a valve governing such inlet, a suspended weight, a connection with the valve operated by the weight when released to open the valve, a valve-casing communicating with the system, a pivoted valve therein having its pivotal pin extending out from the casing, a lever of the first class connected thereto and adapted to normally sustain at one end the suspended weight, and a counterweight at the other end of the lever which in conjunction with the pressure of the system communicated through the valve to the lever is sufficient to maintain the normally-suspended weight.

12. In a sprinkler system, the combination with a pipe or passage from a water-supply to the system, a valve normally closing such passage, a rod or stem for such valve and means for automatically shifting the rod to open the valve consisting of a lever device working in connection with the rod, a suspended main weight conditioned to fall under certain conditions and operate the lever device, a counterweight, a lever supporting the main weight at one end and the counterweight at the other end and means for communicating the force of the pressure of the system to the lever in aid of the counterweight to maintain the other weight in elevated position.

13. In a sprinkler system, the combination with a conductor or passage from a water-supply to the system, a valve governing such passage, a suspended weight, a connection with the valve operated by the weight when released and means for normally supporting and maintaining the weight in a suspended position consisting of a lever normally supporting the weight by contact at one end of the lever, a counterweight adjustably mounted on the other end of the lever, and a valve controlled by the pressure of the sprinkler system and connected to the lever at its fulcrum-point such valve working in aid of the counterweight, whereby as the valve is released from pressure by reason of reduction of pressure in the system the suspended weight will overcome the counterweight and cause admission of water to the system.

14. A sprinkler system, comprising in combination with a water-inlet 1 and the head 2 of a sprinkler system, a valve-body governing the passage from the water-inlet to the system and consisting of two sections 8, 9, a rod or stem 6, having a wedge-shaped head 7 adapted to enter between the sections and force them apart to close the passage, lever device 15, 17, 18 for shifting the rod, the arm 15 having a bifurcated end straddling the rod or stem 6 and a weight 24 conditioned to fall upon reduction of pressure in the system to operate the rod 6 and the valve.

15. In a sprinkler system, the combination with a water-inlet 1 and the head 2 of a sprinkler system, of a valve-body governing the passage from the water-inlet to the system, and consisting of two loosely-connected sections 8 and 9, upper and lower seats 12 in the passage, a rod or stem 6 having a wedge-shaped head 7 to separate the sections and force them upon their seats respectively, a guide 5 for the other end of the rod or stem, an angle-lever device 15, 18, a plunger 21 connected to part 18 and a weight 24 normally suspended but conditioned to fall upon reduction of pressure in the system.

16. In a sprinkler system, the combination with a water-inlet 1 and the head 2 of a sprinkler system, of a casing 3 having a direct passage from the inlet to the head, a valve normally positioned in such passage to close the same and comprising two substantially similar sections having lateral flanges, means for loosely connecting the sections together, ribs or guides on opposite sides of the passages on which the flanges are guided, the casing 3 having a hand-hole adjacent to the front of the valve to give access for setting the same, a removable plate or closure 35 for normally closing the hand-hole, a rod or stem on which the valve-sections are loosely mounted and by whose movement in one direction the same are seated and in the other are withdrawn and means for automatically shifting the rod to withdraw the valve.

17. In a sprinkler system having a valve for admitting water to a dry pipe system, the mechanism for operating the valve by a weight, comprising a suspended weight, a connection with the valve for operating the same upon the fall of the weight, a pipe 27 in communication with the system, a valve-casing 26, a valve 28 therein pivoted upon an extraneously-extending pin 30 and adapted to close an outlet from the pipe, a lever 31 secured to the pin 30, one arm thereof contacting the suspended weight, and a counterweight 32 adjustable on the other arm of the lever, the pressure of the system against valve 28 acting in conjunction with the counterweight to sustain the other weight, such counterweight being insufficient to sustain the same.

18. In a sprinkler system, the combination with a conductor forming a passage between a water-supply and the system, of a valve governing such passage, a suspended weight, a connection with the valve operated by the weight when released to open the valve, and a releasing device comprising a lever, one of whose arms contacts the suspended weight, a counterweight carried on the other arm but insufficient of itself to sustain the suspended weight and means for communicating the pressure of the sprinkler system to the aid of the counterweight.

19. In a sprinkler system, the combination with a conductor forming a passage between a water-supply and the system, of a valve governing such passage, a suspended weight, a connection with the valve operated by the weight when released to open the valve, a counterweight, and a device actuated by the pressure in the system and acting in conjunction with the counterweight to maintain the first-named weight in suspended position, the counterweight of itself being insufficient for that purpose, whereby as the pressure is released the weight will fall and the valve be opened.

20. In a sprinkler system, in combination with a pipe or passage from a water-supply to the sprinkler system, such pipe having a side opening, a closed casing into which the side opening communicates, a two-part valve working through such opening and normally closing the water-passage, a reciprocating rod having a lost motion in the valve for actuating the same, a guide in the closed casing for receiving the free end of the rod and guiding it in its reciprocation and means for automatically reciprocating the rod and causing it to deliver a blow to the valve for withdrawing the same into the closed casing for admitting water to the system.

21. In a sprinkler system, in combination with a pipe or passage from a water-supply to the sprinkler system, such pipe having a side opening, a closed casing into which the side opening communicates, a plunger-valve working through such opening and normally closing the water-passage, a reciprocating rod connected to and actuating the valve, studs or projections upon the rod, a lever-arm pivoted in the closed casing and having a bifurcated end straddling the rod and contacting the studs to withdraw the rod when the valve is to be opened and means for automatically actuating the lever-arm to so actuate the rod and withdraw the valve into the closed casing.

22. In a sprinkler system, the combination with a pipe or passage from a water-supply to the sprinkler system, such pipe having a side opening, a closed casing at the side of the pipe into which casing the side opening communicates, a valve working through such opening and normally closing the water-passage, a reciprocating rod connected to and controlling the valve, an angle-lever pivoted to the casing and having one arm operating within the casing and provided with a bifurcated end straddling the rod for reciprocating the same, the other or outside arm of the lever extending extraneous of the casing and means for actuating the outside arm to operate the rod and open the valve.

23. In a sprinkler system, the combination of a pipe or water-conductor, such pipe having a side opening, a closed casing into which the side opening communicates, a valve working through such opening and normally closing the water-passage, means for automatically operating the valve, the pipe having a second side opening opposite the first-named opening and adjacent to the front end of the valve which is provided with a slot, a key 36 for entering the slot whereby the valve may be manually drawn to its seat, and a closure-plate closing such opening after such operation.

24. In a sprinkler system, the combination of a conductor or passage having a side opening, a closed casing into which said opening enters, a valve for controlling the conductor, a rod connected to the valve to operate the same, a guide 5 in which the free end of the rod travels, a screw-plug 39 closing the guide-passage to the atmosphere and a locking-pin 38 having screw-threads adapted to screw into the guide-passage when the plug is removed and in place thereof whereby the rod may be forced and held in a forward position preparatory to setting the valve in readiness for operation.

25. In a sprinkler system, the combination of a conductor or passage having a side opening, a closed casing into which said opening enters, a valve in two sections, 8, 9, for controlling the water-passage, a rod 6 having a wedge-shaped end 7 entering in between the valve-sections for holding the same to their seats, a guideway 5 within the casing for guiding the other end of the rod, pins or projections 16 on the rod, an angle-lever comprising an arm 15 working inside the casing and having a bifurcated free end straddling the rod and contacting the pins 16 and further comprising an outside arm 18, and a weight conditioned to fall to actuate the arms 18 and 15 and withdraw the valve from the passage.

GEO. E. HIGGINS.
WM. C. HIBBARD.

Witnesses:
SAMUEL E. HIBBEN,
J. N. HANSON.